3,394,884
SYSTEM OF MIXED AIR FLOWS
Thomas J. Lord, Middletown, Ohio, assignor to United Aircraft Products, Inc., Dayton, Ohio, a corporation of Ohio
Filed Nov. 3, 1966, Ser. No. 591,781
9 Claims. (Cl. 236—13)

ABSTRACT OF THE DISCLOSURE

The disclosure relates to a heating system of the type used in an aircraft where compressor bleed air is used as the primary heating fluid. In particular there is disclosed a temperature controlled valve located so as to control the amount of primary heating air supplied and at the same time control the amount of secondary air aspirated from a non-pressurized and unheated source. The relative amounts of primary and secondary air are controlled by a spring biased sleeve valve which is so arranged to be actuated by a fluid relay which in turn is controlled by a temperature sensor that is responsive to the mixture of the primary and secondary air.

---

This invention relates to mixing valve controls, particularly as used in aircraft or the like for space heating wherein engine compressor bleed air is the primary fluid and educted ambient air is the secondary fluid.

An object of the invention is to provide mixing apparatus of the kind described of special utility in aircraft cabin heating.

Another object of the invention is to provide generally new controls in apparatus as described of such simplified compact construction as to make them particularly suitable for aircraft use as mentioned.

A further object of the invention is to provide mixing valve apparatus of general utility characterized by an ability to shut off flow at ambient temperatures too high to maintain a desired temperature value and by an ability to vary the ratio of secondary fluid to primary fluid, especially at high mixed fluid temperatures wherein inflow of the primary fluid tends to decrease.

Other objects and structural details of the invention will appear from the following description, when read in connection with the accompanying drawings, wherein.

Figure 1:
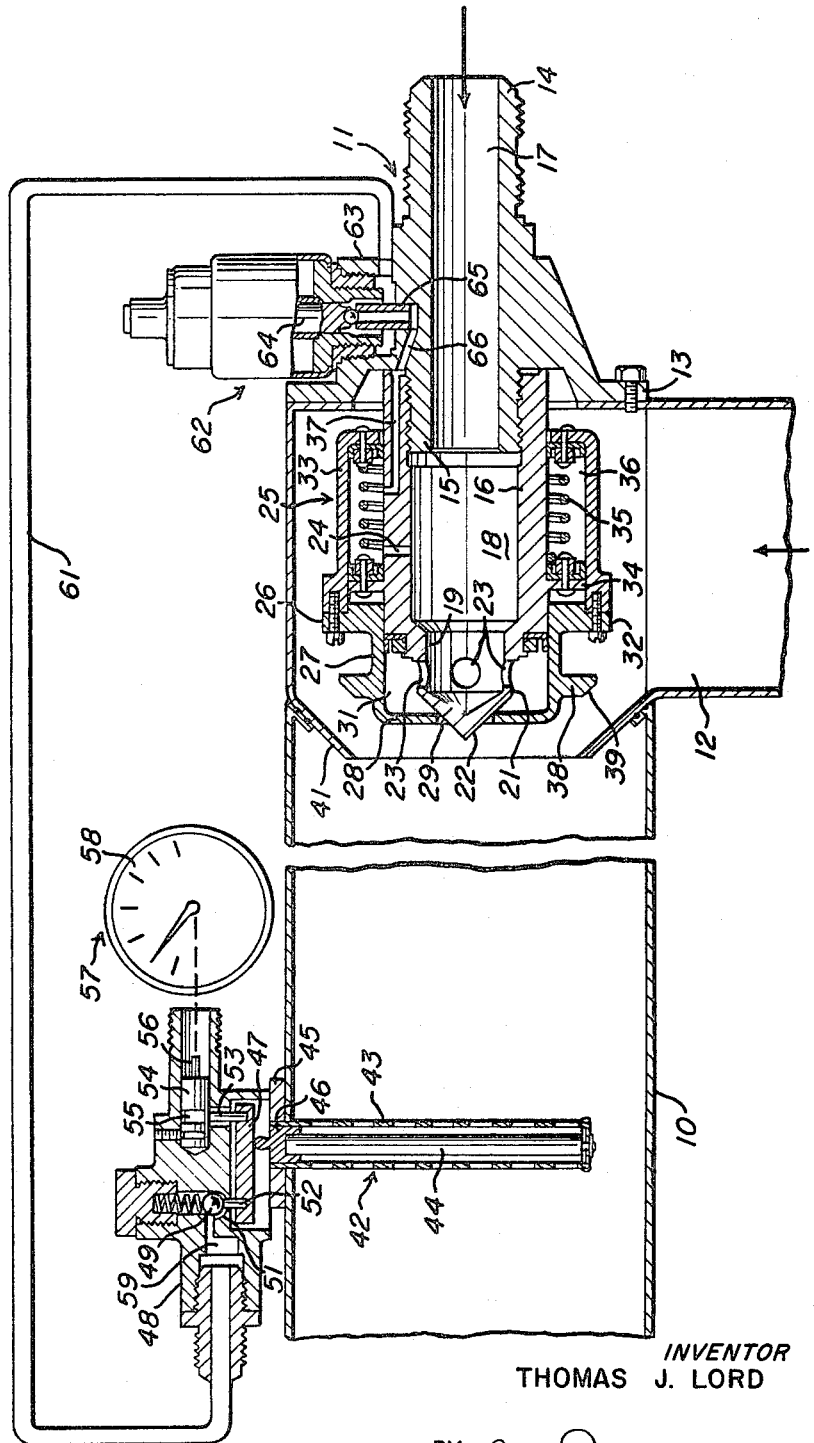
FIG. 1 is a view partly diagrammatic and partly in longitudinal section, showing mixing valve apparatus in accordance with the illustrated form of the invention installed in a fluid flowing duct.

Referring to the drawings, the invention is disclosed as embodied in apparatus for the cabin heating of aircraft, using engine compressor bleed air as the primary heating fluid. A duct 10 conducts warm air to the cabin. A nozzle 11 is received in the entrance end of the duct 10 and directs the high temperature, high pressure compressor bleed air longitudinally into the duct 10. Adjacent its entrance end the duct 10 has an opening 12 disposed laterally of an inner end of the nozzle 11. In an aspirating operation, the details of which will hereafter more clearly appear, ambient air is drawn through opening 12 into the duct. It mixes with the compressor bleed air, having a temperature modulating effect thereon, and the air mixture is guided by the duct 10 to the space to be heated.

Referring again to the nozzle 11, it has an intermediate flange 13 by which it is bolted to the end of the duct 10. An outwardly projecting end 14 of the nozzle is externally threaded for connection with a pressure fluid conducting pipe line or the like leading from the engine compressor. An inner end 15 of the nozzle projects into the duct and has a screw threaded engagement with a nozzle extension 16. A through bore 17 in the nozzle 14 opens into a counterbore 18 in the extension 16. In the center of extension 16 is a bore 19 terminating short of the opposite end of extension 16, which end is reduced in diameter and formed exteriorly thereof with a cylindrical surface 21 terminating at the tip of the nozzle extension in a conical surface 22. In the cylindrical portion 21 are radial openings 23. Intermediate the ends of the nozzle extension, and opening directly from the counterbore 18, is a single, relatively restricted, orifice-like opening 24. Accordingly, the high pressure, high temperature bleed air coming from the engine compressor enters the nozzle through end 14, discharges into counterbore 18 and from there escapes relatively freely through the series of openings 23 and in a more restricted manner from orifice-like opening 24.

The nozzle extension 16 provides a stationary mount for a relatively slidable valve member 25. Such member comprises a body 26 slidably mounted on the extension 16 and projected forwardly, or to the left as viewed in FIG. 1, to form a cylindrical portion 27 the outer end of which is formed as a closed vertical wall 28. In the center of wall 28, aligned with nozzle 14 and extension 16 is an opening 29. The body 27 is laterally spaced from the reduced diameter outer end of nozzle extension 16 and defines therewith a chamber 31 with which nozzle openings 23 communicate. Conical surface 22 on nozzle extension 16 may enter opening 29 and end wall 28 of body 27 seat on such surface to close chamber 31 or may assume relatively projected positions with respect to such surface whereby to provide open flow area around such surface through the opening 29.

At its end opposite wall 28, the body 27 has a radial flange 32. Projecting rearwardly from such flange or to the right as viewed in FIG. 1, is a cup-like member 33. The open end of such member is suitably secured, as by bolting, to the flange 32. The closed end has a substantially sliding contact on the exterior of nozzle extension 16. Intermediate its ends the member 33 has a sliding mount on a flange 34 formed integrally with nozzle extension 16. A compression spring 35 is interposed between the flange 34 and the closed end of cup-like member 33. The pressure exerted by the spring 35 is one to urge the valve sleeve means 25 rearwardly or to the right as viewed in FIG. 1, seating end wall 28 on conical surface 22.

The cup-shaped member 33 forms with nozzle extension 16 a pressure chamber 36 continuously supplied with pressure fluid by way of restricted opening 24. The fluid pressure in this chamber, reacting on the flange 34 of the relatively stationary nozzle assembly urges the valve sleeve means 25 in the same direction as spring 35 or in a direction to seat end wall 28 on conical surface 22. The pressure in chamber 31 reacts on the nozzle assembly in an opposed sense but the provided surfaces are so constructed and arranged as to create normally an overbalancing pressure in favor of chamber 36, that is, one tending normally to seat the valve sleeve means on nozzle surface 22 and thereby to maintain chamber 31 closed. As will subsequently more clearly appear, the pressure in chamber 36 selectively is reduced by being drawn off through a passage 37 in the nozzle extension 16. Should passage 37 be opened, pressure fluid is vented from the chamber 36 more rapidly than it can be supplied thereto through restricted opening 24. The result is a drop in pressure in chamber 36 and a change in the relationship of opposing fluid pressures so that an overbalancing pressure exists in favor of chamber 31. When this occurs, the valve sleeve means 25 advances or moves to the left as viewed in FIG. 1, extending vertical wall 28 relative to the conical surface 22 and opening chamber 31 for discharge of pressure fluid through aperture 29. Closing of the passage 37 allows the pressure in chamber 36 to restore itself to a normal value whereupon the valve sleeve means 25 is retracted and aperture 29 closed by seating on surface 22. It will be understood that the valve sleeve means may assume intermediate positions in which more or less of the area of aperture 29 is open to flow of the pressure fluid from chamber 31.

On the exterior of cylindrical portion 27 of valve body 26 is external valve means in the form of a radial flange 38 on which is formed a forwardly facing inclined surface 39. The latter is in a complementary relation to and is adapted to make contact with an angularly inturned duct portion 41 defining an annular valve seat. The seat 41 is so positioned relative to the described nozzle and valve assembly as to be engaged by the surface 39 in a fully projected position of the valve sleeve means. So engaged, the external valve 38 denies flow of secondary ambient fluid into the duct through opening 12. In relatively retracted position, the valve 38 opens an area of flow along seat 41 for the secondary fluid, the amount of open flow area varying with the degree of retraction of the valve body 26.

The control of venting from the channel 16, and thereby the control of positioning of the valve sleeve means 25 is in the illustrated instance made a function of mixed fluid temperature in the duct 10. Thus, downstream of the valve seat 41 there is inserted in duct 10 bi-metal means 42. Such means comprises a laterally perforated tube 43 made of a first temperature responsive metal, for example aluminum within which is disposed a rod 44 of a relatively temperature insensitive material such as Invar. The tube 43 is secured at its upper or outer end to a flange 45 made fast to the duct 10. At its inner end the tube is secured to the inner end of rod 44. In response to temperature change, the tube 43 extends and retracts in a longitudinal sense relative to its fixed base member 45. The relatively unaffected rod 44 thereby is caused to move longitudinally within the tube. At its upper or outer end the rod 44 connects with a plunger 46 providing a point of engagement with and fulcrum for a lever 47. The latter is recessed in a valve body 48 in which is a ball valve 49 spring pressed to a seat in the body closing a vertical flow pass 51 communicating with the recessed area receiving lever 47. A pin 52 is installed in one end of lever 47 and projects upward through passage 51 to engage ball valve 49. At the other end of lever 47 there is installed a similar upwardly projecting pin 53 making engagement with a rotatable cam member 54. An eccentric surface 55 on the cylindrical member 54 directly is engaged by pin 53. Rotary adjustment of the member 54 has the effect of variably projecting pin 53 and thereby variably rocking the lever 47 about the fulcrum as defined by plunger 46. A key 56 on member 54 is engaged by indicator adjustment means 57 in a manner here diagrammatically suggested, with rotary positions of adjustment of the member being shown on a dial 58.

According to the construction and arrangement of parts as above described, an upward thrust of rod 44, brought about by shrinking of the tube 43, causes lever 47 to move arcuately upward, reacting upon pin 53 and member 54, to unseat valve 49. When this occurs a chamber 59 in body 48 is vented to the exterior of the body or to ambient surroundings through the passage 51. In a seated position of the valve this chamber is closed from communication with ambient surroundings.

The chamber 59 is connected by tubing 61 or the like to the previously mentioned vent passage 37 in nozzle extension 16, there being interposed in such connection a solenoid valve 62 serving as a system on-off control. The solenoid valve 62 is installed in an upstanding boss 63 on nozzle 14. It includes a valve plunger 64 which in an extended or non-energized condition of the solenoid engages in and closes the upper end of a tube 65. The latter is installed in nozzle 14 to extend upward into boss 63. A lateral passage 66 at its lower end connects with and forms a continuation of the vent passage 37. Accordingly, in a non-energized condition of the solenoid the vent passage 37 and its extension 66 are closed. Should the solenoid be energized and the plunger 64 thereby retracted, tube 65 is opened. Pressure fluid then is free to flow out of chamber 36 to and through passages 37 and 66, upwardly through tube 65 and over and around such tube reversely into the bottom of boss 63 at which point it communicates with tubing 61, connected into the base of boss 63. In the open position of solenoid valve 62, therefore, pressure fluid from chamber 36 has free access to the chamber 59 in body 48 of the thermal unit. Whether the pressure fluid reaching chamber 59 is permitted to escape to ambient surroundings, and thereby lower the pressure in chamber 36 is a function of the position of ball valve 49.

In the operation of the system, primary fluid in the form of high temperature, high pressure engine compressor bleed air is continuously supplied to nozzle 14. However, in the absence of any venting of pressure from chamber 36 the sleeve valve 25 occupies a retracted position seating end wall 28 on surface 22 and closing end opening 29. Since there is no flow of primary fluid there is no eduction of secondary fluid or ambient air through opening 12 and into the duct past seat 41. There is thus no fluid flow through the duct 10 to the space to be heated. In starting the system, indicator means 57 is set to select a desired mixed air temperature value. This has the effect of rotating cam member 54 to achieve a selected, relatively projected position of pin 53 and thereby a greater or lesser upward thrust of pin 52. The pin 52 so is positioned to achieve a higher or lower position of the ball valve 49 from its seat in the cold or unheated condition of the system. Solenoid valve 62 then is energized to retract plunger 64, placing the system in operation.

Assuming the system, at the start, to be cold the rod 44 occupies an upwardly projected position, unseating ball valve 49. Accordingly, when solenoid plunger 64 retracts to an open position venting of chamber 36 begins, the pressure fluid therein flowing outward through passages 37 and 66 and through tube 65 to the bottom of boss 63 from which it is conducted by tubing 61 to chamber 59 of body 48. There it is free to escape past the open ball valve 49 to ambient surroundings. The resulting decrease in pressure in chamber 36 changes the balance of pressures acting on sleeve valve 25 with the result that this member moves forwardly or to the left in a direction to unseat wall 28 from conical surface 22 and to cause outer valve surface 39 to approach seat 41. This motion continues until surface 39 engages seat 41. Ambient surroundings thereby are cut off from the system and the high temperature primary fluid flows exclusively through the duct 10 by way of the now fully open aperture 29. The hot air contacts and stretches the tube 43 of thermal means 42 causing an extending or retracting motion of rod 44. Lever 47 correspondingly drops, allowing ball valve 49 to return toward a seat closing passage 51. At an earlier or later point in the downward movement of lever 47, depending upon the initial adjustment of cam member 54, ball valve 49 reaches its seat and closes passage 51. When this occurs venting of chamber 36 stops. The pressure therein builds up due to the continuous admission of primary fluid by way of restricted opening 24. The original condition of pressure unbalance in favor of chamber 36 tends to be restored with a consequent retracting effect on sleeve valve 25. As the slide valve retracts, annular valve portion 38–39 lifts from seat 41 allowing ambient air to enter opening 12 and to mix with the higher temperature compressor bleed air. The ambient air has a temperature modulating effect upon the compressor bleed air and the air mixture reaching thermal means 42 has a reduced temperature. The downstream air temperature accordingly becomes a function of the position of sleeve valve 25 in admitting a greater or lesser quantity of ambient air.

Figure 3:
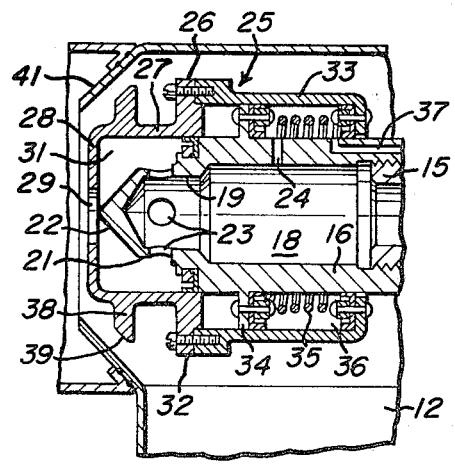
FIG. 3 is a fragmentary view of the valve means of FIG. 1 indicating what may be considered a normal valve position wherein the primary and secondary fluid flows are in approximately a one to one ratio.

As the sleeve valve continues to retract it may reach an intermediate position substantially as shown in FIG. 3 wherein valve enforced restriction to both flows is at a minimum. At this time, flow of compressor bleed air and ambient air is in a mixing ratio of approximately one to one. Should the ambient air temperature or the compressor bleed air temperature, or both thereof, be too high to mix to the preselected mixed air temperature, the sleeve valve 25 will continue to retract. In doing so a condition of maximum access of ambient air is maintained while at the same time throttling of compressor bleed air begins. If temperature conditions remain unsatisfied, flow of compressor bleed air further is throttled. Velocity of flow through the aperture 29 is increased with the result that the eduction or pumping ratio changes, a greater proportion of ambient air being drawn into the heating duct in proportion to each part of compressor bleed air injected therein. This may continue until, while total flow of the mixed air is reduced, the volume of ambient air brought into the duct is a multiple of the volume of injected primary fluid. If ambient air temperatures prove to be too high to provide the desired preselected outlet temperature, the slide valve 25 closes completely, effectively shutting off all flow.

The conical surface 22, in cooperation with the edge of circular aperture 29, provides for the described changing ratio as the slide valve approaches a fully throttled or closed position. As the valve approaches a closed position the greater restriction imposed upon flow of the primary fluid would in the absence of the present concept have a correspondingly reduced effect upon eduction of the secondary fluid. The result would be to reduce the inflow of the cooler air at a time when additional cooling is being called for. By progressively increasing the velocity of flow of the primary fluid, however, it is possible to maintain secondary flow at a high level which may reach in the illustrated instance ratios of approximately four times the flow of the primary fluid.

Figure 2:
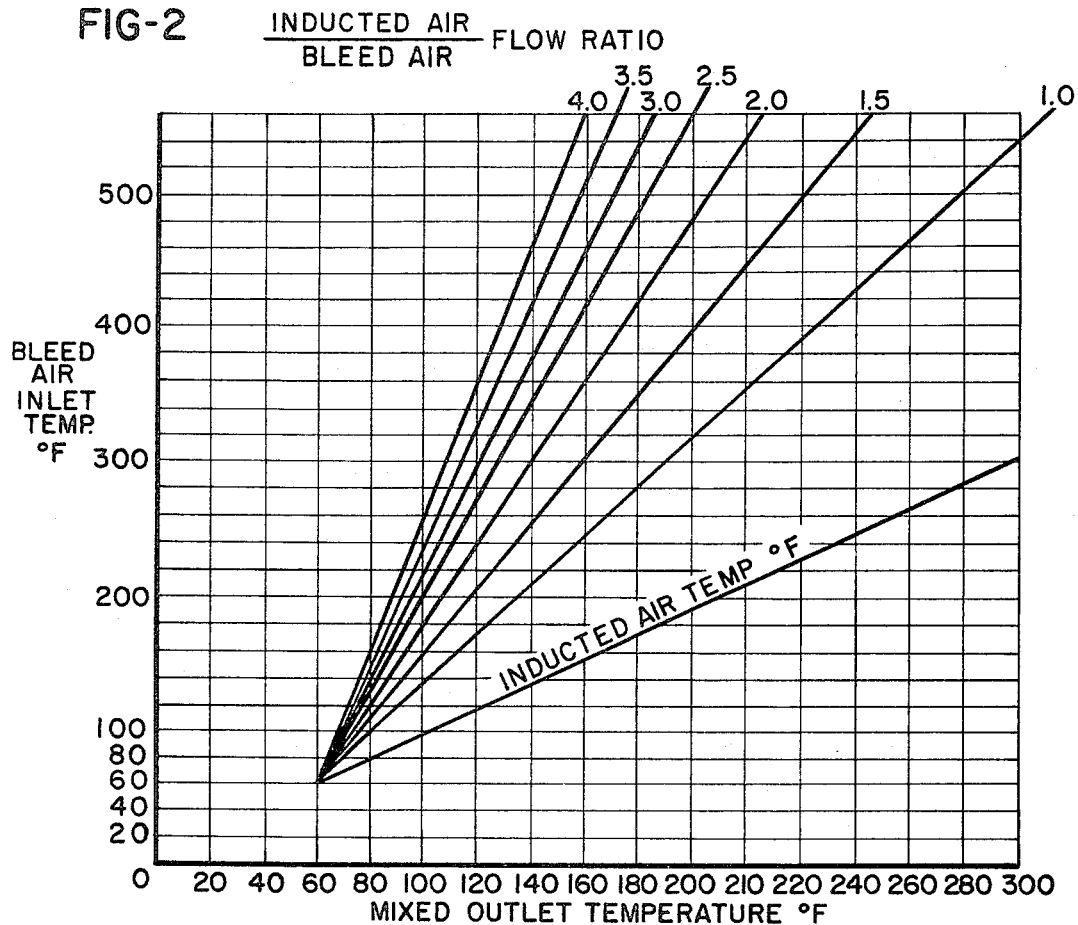
FIG. 2 is a diagram indicating changing flow ratios of the educted secondary fluid at different fluid component and mixed fluid temperatures.

FIG. 2 shows the calculated mixed outlet air temperatures possible with given inlet temperature conditions for various mixing ratios. As seen, a line "Inducted Air Temp. ° F." is marked with a temperature scale indicating the temperature of the ambient inducted air or secondary fluid admitted to the system by way of opening 12. A location at 60° has been selected on this scale from which a family of curves extend representing respectively different ratios of flow as between the primary and secondary fluids. Diagrammatically illustrated are the changing valve efficiencies and the manner in which adjustment is made from one level of efficiency to another in response to a change in compressor bleed air temperature or ambient air temperature or both. For example, if the dial indicator 57 should be set to select a mixed air outlet temperature of 220° and if the compressor bleed air temperature is 400° and the inducted ambient air temperature is 60° the slide valve 25 will position itself to achieve the necessary mixture according to an approximately one to one ratio. Should the bleed air inlet temperature increase, as to a value on the order of 500° the increase in temperature of the mixed air, as sensed by the thermal means 42, would bring about a further retraction of the slide valve 25, the valve stabilizing in a position yielding a flow of ambient air approximately one and one-half times the flow of compressor bleed air. Similarly, a drop in compressor bleed air temperature would find the sleeve valve 25 adjusting toward valve seat 41, decreasing the flow of ambient air relative to the bleed air. With respect to changes in the inducted air temperature it will be understood that a separate family of curves exists with respect to the different such air temperatures proportionally displaced with respect to that illustrated. An increase in inducted air temperature, as to a value on the order of 100° would accordingly bring an increase in the flow of ambient air relative to flow of bleed air in a ratio on the order of 1.25 to 1.

Changes in structural details are considered to be within the reasonable scope of the invention as defined in appended claims.

What is claimed is:

1. In an aircraft or the like using engine compressor bleed air as a primary fluid for space heating a duct leading to a space to be heated, said primary fluid being conducted to said duct, said duct providing open area through which secondary fluid in the form of ambient air may be aspirated to mix with said primary fluid with a temperature modulating effect, a valve seat in said duct downstream of said open area, a fixed nozzle extending into said duct in axially spaced relation to said valve seat through which the primary fluid discharges, and a valve sleeve movable axially in said duct between said seat and said nozzle simultaneously to control flow of said primary and secondary fluids, said valve sleeve being capable of moving to exercise a throttling effect upon primary fluid and simultaneously therewith to vary the said open area through which secondary fluid is educted, said open area tending to increase and reduce in direct relation to the degree of throttling exerted on the primary fluid, said valve sleeve being capable of assuming a position in which valve enforced restriction of both fluid flows is at a minimum and wherein the ratio of such flows is approximately one to one, said valve sleeve being so constructed that movement thereof from said position in a direction further to throttle the flow of primary fluid increases the velocity of such primary fluid so that whereas total flow may be reduced the amount of educted secondary fluid increases relative to the permitted flow of primary fluid.

2. A combination according to claim 1, characterized by thermal means sensing mixed fluid temperature downstream of said valve means for moving said valve sleeve.

3. In an aircraft or the like using engine compressor bleed air as a primary fluid for space heating a duct leading to a space to be heated, said primary fluid being conducetd to said duct, said duct providing open area through which secondary fluid in the form of ambient air may be aspirated to mix with said primary fluid with a temperature modulating effect, valve means moving to exercise a throttling effect upon primary fluid and simultaneously therewith to vary the said open area through which secondary fluid is educted, said open area tending to increase and reduce in direct relation to the degree of throttling exerted on the primary fluid, said valve means being capable of assuming a position in which valve enforced restriction of both fluid flows is at a minimum and wherein the ratio of such flows is approximately one to one, a nozzle extending into said duct to admit said primary fluid, said nozzle having lateral openings for discharge of said primary fluid, the outer end of said nozzle being closed and formed with a tapered nose portion, said valve means comprising a longitudinally adjustable sleeve surrounding said nozzle and receiving the discharge of said primary fluid, said sleeve having a longitudinal end opening for the escape of said primary fluid, the outer end of said nozzle being received in and throttling flow through said end opening, longitudinal adjustment of said valve sleeve varying the open area of said end opening.

4. A combination according to claim 3, characterized in that the open area in said duct providing for education of secondary fluid is in part defined by an annular valve seat therein, motion of said valve sleeve to increase the open area of said end opening therein causing said sleeve to approach said valve seat and reduce the flow of secondary fluid therethrough.

5. A combination according to claim 3, characterized by an annular valve seat on the interior of said duct, the open area provided by said duct conducting secondary fluid around said valve sleeve into said duct by way of said valve seat, said valve sleeve being adjustable between opposite extremes of motion in one of which it engages said valve seat to permit exclusively a flow of primary fluid only into said duct and in the other of which it seats on the end of said nozzle to shut off the flow of primary fluid whereby to stop flow of all fluid through said duct.

6. In an aircraft or the like using engine compressor bleed air as a primary fluid for space heating, a duct leading to a space to be heated, said primary fluid being conducted to said duct, said duct providing open area through which secondary fluid in the form of ambient air may be aspirated to mix with said primary fluid with a temperature modulating effect, valve means moving to exercise a throttling effect upon primary fluid and simultaneously therewith to vary the said open area through which secondary fluid is educted, said open area tending to increase and reduce in direct relation to the degree of throttling exerted on the primary fluid, said valve means being capable of assuming a position in which valve enforced restriction of both fluid flows is at a minimum and wherein the ratio of such flows is approximately one to one, a nozzle extending into said duct to admit said primary fluid, said nozzle having lateral openings for the discharge of said primary fluid, the outer end of said nozzle being closed, and formed with a tapered nose portion, said valve means comprising a longitudinally adjustable sleeve surrounding said nozzle and receiving the discharge of said primary fluid, said sleeve having a longitudinal end opening for escape of said primary fluid, the outer end of said nozzle being received in and throttling flow through said end opening, longitudinal adjustment of said valve sleeve varying the open area of said end opening therein, the interior of said duct providing an annular valve seat, the open area provided by said duct conducting secondary air around said valve sleeve into said duct by way of said valve seat, said valve sleeve being adjustable between opposite extremes of motion in one of which it engages said valve seat to permit exclusively a flow of primary fluid only into said duct and in the other of which it seats on the end of said nozzle to shut off the flow of primary fluid whereby to stop flow of all fluid through said duct, said valve sleeve having an intermediate position in which the flow of primary fluid and of secondary fluid is in an approximately one to one ratio, movement of said sleeve toward a seat on said nozzle from said position increasing the velocity of primary fluid flow for an increase in secondary fluid flow relative to primary fluid flow.

7. In an aircraft or the like using engine compressor bleed air as a primary fluid for space heating, a duct leading to a space to be heated, said primary fluid being conducted to said duct, said duct providing open area through which secondary fluid in the form of ambient air may be aspirated to mix with said primary fluid with a temperature modulating effect, valve means controlling the admission of secondary fluid to establish the mixed air in said duct at a predetermined temperature value, and means responding to the presence of an ambient temperature to high to provide a desired mixed air temperature to operate said valve means to shut off flow of primary fluid.

8. In an aircraft or the like using engine compressor bleed air as a primary fluid for space heating, a duct leading to a space to be heated, said primary fluid being conducted to said duct, said duct providing open area through which secondary fluid in the form of ambient air may be aspirated to mix with said primary fluid with a temperature modulating effect, thermal means in said duct sensing changes in mixed air temperature, and valve means under the control of said thermal means attempting to maintain the mixed air temperature at a predetermined value, said valve means including a longitudinally adjustable valve member operable in opposite extreme positions respectively to close off flow of primary fluid and of secondary fluid, said valve means assuming the first said position when secondary fluid temperature is too high to provide a mixed air temperature of said predetermined value and assuming the second said position in a cold or unheated condition of the system, said valve means normally modulating flow of the different fluids to achieve said temperature of predetermined value.

9. A combination according to claim 8, wherein primary fluid pressure is applied to said valve means in opposing senses, a pressure chamber being provided in which normally over balancing pressure urges said valve means to occupy the first said extreme position, said thermal means being operable at mixed air temperatures below said predetermined value to vent pressure from said pressure chamber.

References Cited

UNITED STATES PATENTS

| 2,933,035 | 4/1960 | Phillips | 98—38 |
| 3,163,100 | 12/1964 | McGrath | 98—38 X |
| 3,248,055 | 4/1966 | Lord | 236—13 |

FOREIGN PATENTS 570,502  2/1959  Canada.

ROBERT A. O'LEARY, *Primary Examiner.*

W. E. WAYNER, *Assistant Examiner.*